Dec. 20, 1932.　　　　W. FROST　　　　1,891,807
MACHINE FOR WEIGHING AND GRADING EGGS
Filed March 28, 1930

INVENTOR:
W. Frost

BY HIS ATTORNEYS:

Patented Dec. 20, 1932

1,891,807

UNITED STATES PATENT OFFICE

WALTER FROST, OF ROCHDALE, ENGLAND

MACHINE FOR WEIGHING AND GRADING EGGS

Application filed March 28, 1930, Serial No. 439,774, and in Great Britain April 2, 1929.

This invention has for its object to provide a simple and reliable machine for weighing eggs and grading them according to their weight.

My invention comprises a machine in which each egg to be graded according to its weight is carried in a scale pan or its equivalent which is lowered to an extent depending upon the weight of the egg thereon with means at different heights corresponding to various extents of depression of the scale pans causing the delivery of the eggs at different places according to their weight.

The invention further comprises the arrangement wherein the scale pans are tilted by one or other of the means of varying height in order to deliver the eggs therefrom.

The invention further comprises the improved arrangement and combination of parts hereinafter described and claimed.

Referring to the accompanying sheet of explanatory drawing:—

Figure 1:
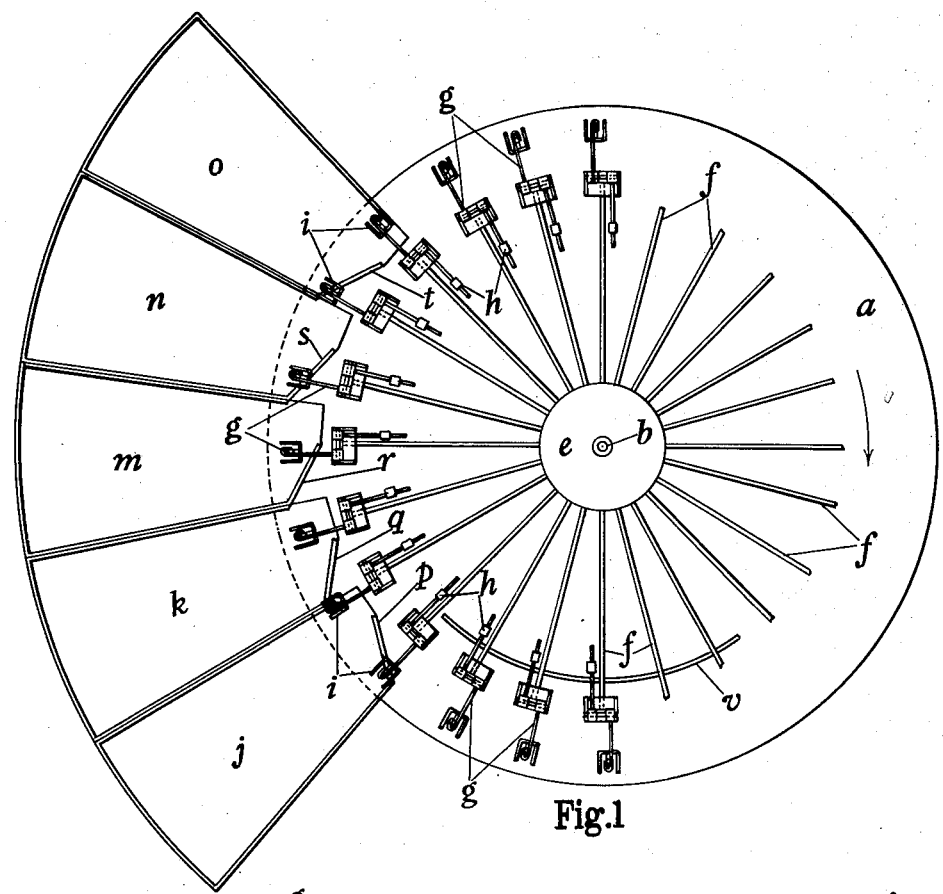
Figure 2:
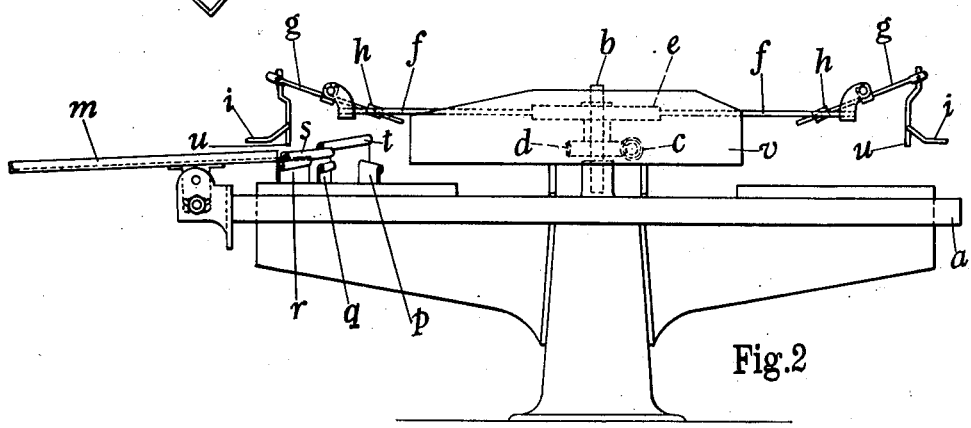

Figure 1 is a plan view and Figure 2 an elevation (with parts omitted for the sake of clearness) showing a machine constructed in one convenient form in accordance with my invention.

The same reference letters in the two views indicate the same parts.

The machine comprises a circular table $a$ with a vertical spindle $b$ mounted therein and rotated by the worm and worm wheel $c$ and $d$ respectively. The spindle $b$ carries a disc $e$ from which radiate arms $f$ each carrying a bracket with a balance or weighing scale $g$ thereon. In Figure 1, the balances or scales at the right hand side have been omitted for the sake of simplicity of illustration.

The weight $h$ upon the scale arm is adjustable to suit any particular predetermined requirements and such arm is so arranged that as the end with the scale pan $i$ or its equivalent, (in the example illustrated two wires form a cradle to support the eggs) is depressed, the effective counterbalancing weight increases so that there is a certain degree of depression corresponding to each definite weight of egg.

Around the table $a$ are arranged a number of trays or troughs $j, k, m, n$ and $o$ to receive the graded eggs, the heaviest eggs being delivered into the tray $j$ and the lightest or rejects into the tray $o$. The trays are angularly adjustable as shown in Figure 2.

At the entrance to each tray is provided a guide wall, the several guides being lettered $p, q, r, s$ and $t$. They are of gradually increasing heights from $q$ to $t$ and are adapted to be engaged by the parts $u$ of the scale pan ends of the balances. If owing to the weight of the egg thereon, the scale pan of a balance is depressed to the maximum extent, then its part $u$ will engage the guide wall $p$ which due to its inclination to the circular path of travel of the balance will press such part $u$ inwards towards the disc $e$ thereby lowering the scale pan until the egg thereon can roll therefrom into the tray $j$. If the egg be slightly less heavy, the part $u$ of the balance will engage the guide $q$ and tilt the scale pan to roll the egg into the tray $k$.

A wall $v$ is arranged to come beneath the side of the scale arm at which the scale pan is placed at the part of the machine where loading of the eggs into the scale pans is effected so that such pans are supported against depression during loading. The wall $v$ is inclined upwards at one end to raise the said ends of the scale arms and inclined downwards at the other end to allow the balance weights $h$ to become operative.

I do not limit myself to any particular form of scale pan or receptacle to hold the eggs during weighing, nor to any particular number of arms $f$ and of trays to receive the graded eggs. The loading of the eggs into the trays may be done manually or by suitable mechanism. The rotating of the worm $c$ may be effected in any desired manner at the desired speed for efficient operation of the machine.

What I claim is:

An egg weighing and grading machine comprising, in combination, a fixed circular table, a vertical spindle mounted in said table, means for rotating said spindle, a disc carried by the spindle, arms radiating from said disc, a balance arm fulcrumed upon the outer end of each radial arm, an adjustable weight mounted upon the inner end of each balance arm, a cradle pivotally mounted to the outer end of said balance arm, into which an egg is placed so as to depress the cradle to an extent varying with the weight of the egg, trays arranged around the outside of the circular table to receive the graded eggs, guide walls arranged one at each entrance to the trays, the said walls being of gradually increasing height and disposed angularly across the path of rotation of the cradles, a projection on each cradle which engages one or other of the said guide walls thereby tilting the cradle and discharging the egg into its corresponding tray, and a fixed wall for supporting the cradles against depression during loading.

In testimony whereof I have signed my name to this specification.

WALTER FROST.